United States Patent [19]
Speas

[11] Patent Number: 4,827,206
[45] Date of Patent: May 2, 1989

[54] SOLAR POWER SYSTEM FOR ELECTRONIC PARKING METER

[75] Inventor: Gary W. Speas, Little Rock, Ark.

[73] Assignee: POM, Incorporated, Russellvile, Ark.

[21] Appl. No.: 173,582

[22] Filed: Mar. 25, 1988

Related U.S. Application Data

[63] Continuation-in-part of Ser. No. 37,252, Apr. 16, 1987.

[51] Int. Cl.⁴ ........................ G05F 5/00; H02J 7/00
[52] U.S. Cl. ........................ 323/299; 323/906
[58] Field of Search ............... 323/299, 300, 303, 282, 323/284, 288, 906

[56] References Cited

U.S. PATENT DOCUMENTS

| | | | |
|---|---|---|---|
| 2,656,908 | 2/1950 | Ellison . | |
| 2,807,016 | 9/1938 | Gloess . | |
| 3,166,732 | 8/1962 | Ljungman et al. . | |
| 3,373,856 | 5/1966 | Kusters et al. . | |
| 3,482,110 | 12/1969 | Robinson . | |
| 3,535,870 | 10/1970 | Mitchell . | |
| 3,541,308 | 11/1970 | Ruby . | |
| 3,575,586 | 4/1971 | Kroll . | |
| 3,760,160 | 9/1973 | Gieringer et al. . | |
| 3,909,826 | 9/1975 | Schildmeier et al. . | |
| 3,948,375 | 4/1976 | Selby, Jr. . | |
| 3,999,372 | 12/1976 | Welch et al. . | |
| 4,031,991 | 6/1977 | Malott . | |
| 4,034,193 | 7/1977 | Jackson . | |
| 4,080,598 | 3/1978 | Cardone . | |
| 4,228,519 | 10/1980 | Pfeifer . | |
| 4,249,648 | 2/1981 | Meyer . | |
| 4,275,272 | 6/1981 | Mennino, Jr. et al. . | |
| 4,310,890 | 1/1982 | Trehn et al. . | |
| 4,311,953 | 1/1982 | Fukuda et al. | 323/906 |
| 4,356,903 | 11/1982 | Lemelson et al. . | |
| 4,375,662 | 3/1983 | Baker | 323/299 |
| 4,379,334 | 4/1983 | Feagins, Jr. et al. . | |
| 4,460,080 | 7/1984 | Howard . | |
| 4,483,431 | 11/1984 | Pratt . | |
| 4,568,877 | 2/1986 | Tinsley | 323/299 |
| 4,571,532 | 2/1986 | Jaster | 323/906 |
| 4,576,273 | 3/1986 | Milnes . | |
| 4,614,879 | 9/1986 | Ault | 323/906 |

*Primary Examiner*—Peter S. Wong

[57] ABSTRACT

A solar power system for an electronic parking meter. At least one solar cell array is connected to the anode of a first diode and at least one current regulating diode has its anode connected to a cathode of the first diode. At least one storage capacitor is connected between a cathode of the current regulating capacitor and ground. At least one second diode has its anode connected to the storage capacitor and has its cathode connected to an input of a voltage regulator. An output of the voltage regulator provides a supply voltage for the electronic parking meter. The input of the voltage regulator is also connected to the cathode of the first diode. A monitor circuit monitors a voltage level at the input of the voltage regulator. A microprocessor is connected to the monitor and when the voltage level decreases below a first threshold, the microprocessor shuts down the electronic parking meter in an orderly manner. When the electronic parking meter is shut down, the voltage regulator outputs a reset signal when the voltage level at the input of the voltage regulator exceeds a second threshold level, the reset signal is received by the microprocessor.

6 Claims, 17 Drawing Sheets

SOLAR POWER SYSTEM FOR ELECTRONIC PARKING METER

This is a continuation-in-part of pending application Ser. No. 037,252 filed Apr. 16, 1987.

BACKGROUND OF THE INVENTION

This invention relates in general to electronic timing devices and, in particular, to electronic parking meters.

Both mechanical and electronic parking meters are well known in the prior art and are typically of the type which are responsive to the insertion of a coin to begin timing an interval for which a vehicle may be parked in an appropriate space associated with the parking meter. The timing interval is typically determined by the number and value of the coins which are inserted into the parking meter. The parking meters can be associated with a single parking space or a single parking meter may be used for an entire lot of multiple spaces.

The more recently developed electronic parking meters are an improvement over the older type mechanical parking meters. The electronic parking meters are typically more reliable and require less service. However, many of these electronic type parking meters still employ portions of them which are mechanical.

It is a feature of the present invention to provide an all eletronic parking meter which is more dependable, has a greater variety of features, and is more economical to manufacture than prior art parking meters. It is an advantage of the present invention that the novel electronic parking meter can be utilized with a hand-held auditor for programming parking meters and also gathering data from the parking meter and which can be connected to the parking meter directly by means for a cable or can be interfaced to the parking meter through an infrared transmission system. It is another feature of the present invention that a sonar range finder may be utilized as a part of the electronic parking meter for detecting the presence or absence of a vehicle in a space associated with the meter.

SUMMARY OF THE INVENTION

The present invention involves a solar power system for an electronic parking meter. At least one solar cell array is connected to the anode of a first diode and at least one current regulating diode has its anode connected to a cathode of the first diode. At least one storage capacitor is connected between a cathode of the current regulating capacitor and ground. At least one second diode has its anode connected to the storage capacitor and has its cathode connected to an input of a voltage regulator. An output of the voltage regulator provides a supply voltage for the electronic parking meter. The input of the voltage regulator is also connected to the cathode of the first diode. A monitor circuit monitors a voltage level at the input of the voltage regulator. A microprocessor is connected to the monitor and when the voltage level decreases below a first threshold, the microprocessor shuts down the electronic parking meter in an orderly manner. When the electronic parking meter is shut down, the voltage regulator outputs a reset signal when the voltage level at the input of the voltage regulator exceeds a second threshold level, the reset signal is received by the microprocessor.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability but is most advantageously utilized in a parking meter for use with an associated space in which a vehicle may park. It is to be understood, however, that the present invention or portions thereof may be used for a variety of different applications wherever a paid timing function is to be utilized.

Figure 14A:
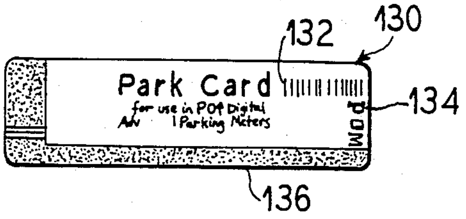
FIGS. 14A and 14B depict front and back view of a credit card type element for use with the FIG. 1 meter.
Figure 14B:
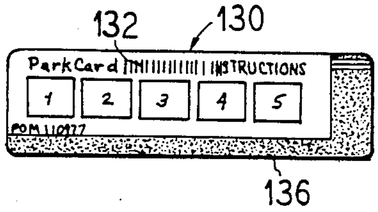

In general terms, the novel electronic parking meter system of the present invention is utilized to receive one or more types of coins. It is to be understood, however, that the meter could also be adapted to receive paper money or a credit card, such as depicted in FIGS. 14A and 14B. The electronic parking meter has a power supply which is connected to a microprocessor which has a memory. The microprocessor typically has a power-up mode, a standby mode and an operational mode. A coin signal generator produces a coin signal upon receipt of a coin by the meter. After receiving the coin signal, an interrupt logic circuit places the microprocessor in the operational mode from the standby mode. An oscillator is connected to the microprocessor and to the interrupt logic circuit. The meter has a plurality of coin detectors and the coin sequentially passes these detectors without substantially stopping or contacting the detectors. An electronic display is connected to the microprocessor for displaying pertinent information such as money deposited, time remaining on the meter, etc.

The meter also has a reset logic circuit for placing the microprocessor in a power-up mode which is typically utilized when the meter is first placed in operation. The reset logic circuit is connected at least to the microprocessor. Furthermore, the meter may have an interface for connecting an auditor. The microprocessor and the auditor exchange information such as programming of the microprocessor from the auditor and sending data from the microprocessor to the auditor regarding money deposited in the meter and other operational parameters.

In addition, the meter may also have a sonar range finder system which detects the presence or absence of a vehicle in an associated parking space. The sonar range finder system is connected to the microprocessor for operation.

When the electronic parking meter is first placed into operation, the reset circuitry is activated, for example, by the auditor, and causes the microprocessor to be placed in a power-up mode. During the power-up mode, the microprocessor performs diagnostic tests on the components of the meter and also initializes any appropriate circuitry in the meter. In addition, an oscillatory is activated and runs at a fixed frequency. The microprocessor may be programmed to accept different types of coins by inserting a coin a plurality of times through the meter during which the microprocessor samples signals coming from the coin detectors in the meter and "learns" which type of coins are to be accepted.

When the power-up mode is complete, the microprocessor is placed in a standby mode in which it is still connected with the power supply of the meter. Also, during the standby mode, the oscillator continues to be operational. When a coin is placed into the meter a signal is sent to the microprocessor which causes it to change from the standby mode to the operational mode. As the coin falls through the meter, the coin detectors send appropriate signals to the microprocessor. The information regarding the amount of coins entered into the meter and the amount of time the meter will run, as well as, any other pertinent parameters is displayed on a display device connected to the microprocessor. During the timing function of the meter, the microprocessor is intermittently placed in the operational mode from the standby mode to update the time display and to identify when the timing has reached zero. Furthermore, the time display has an additional internal oscillator which may be instructed to flash an element of the display, such as a no parking signal, while the microprocessor is in the standby mode.

When the meter is equipped with a sonar range finder, the microprocessor, when it intermittently enters its operational mode, will cause the sonar range finder to determine if the vehicle is still present in the associated space. If the vehicle is not detected, the microprocessor then causes the meter to return to zero.

The auditor unit utilized with the electronic parking meter forms a part of the electronic parking meter system and is utilized to exchange data and information with the parking meter. Typically, this would include programming the parking meter to change the amount of time per type of coin inserted in the meter, and to collect data from the meter, such as the amount of money deposited and operational parameters of the meter. The auditor unit may be a hand-held general purpose computer which is equipped either with a cable for direct connection to the meter or with an infrared transmitter receiver system so that the auditor may be interfaced to the electronic parking meter from a distance. This is advantageous when an attendant desires to interface with the electronic parking meter while remaining in a vehicle. A feature of the present invention is that when the auditor unit is connected by cable to the electronic parking meter, the cable may be utilized to provide electrical power to the meter to recharge the meter's power supply or to activate the microprocessor.

Figure 1:
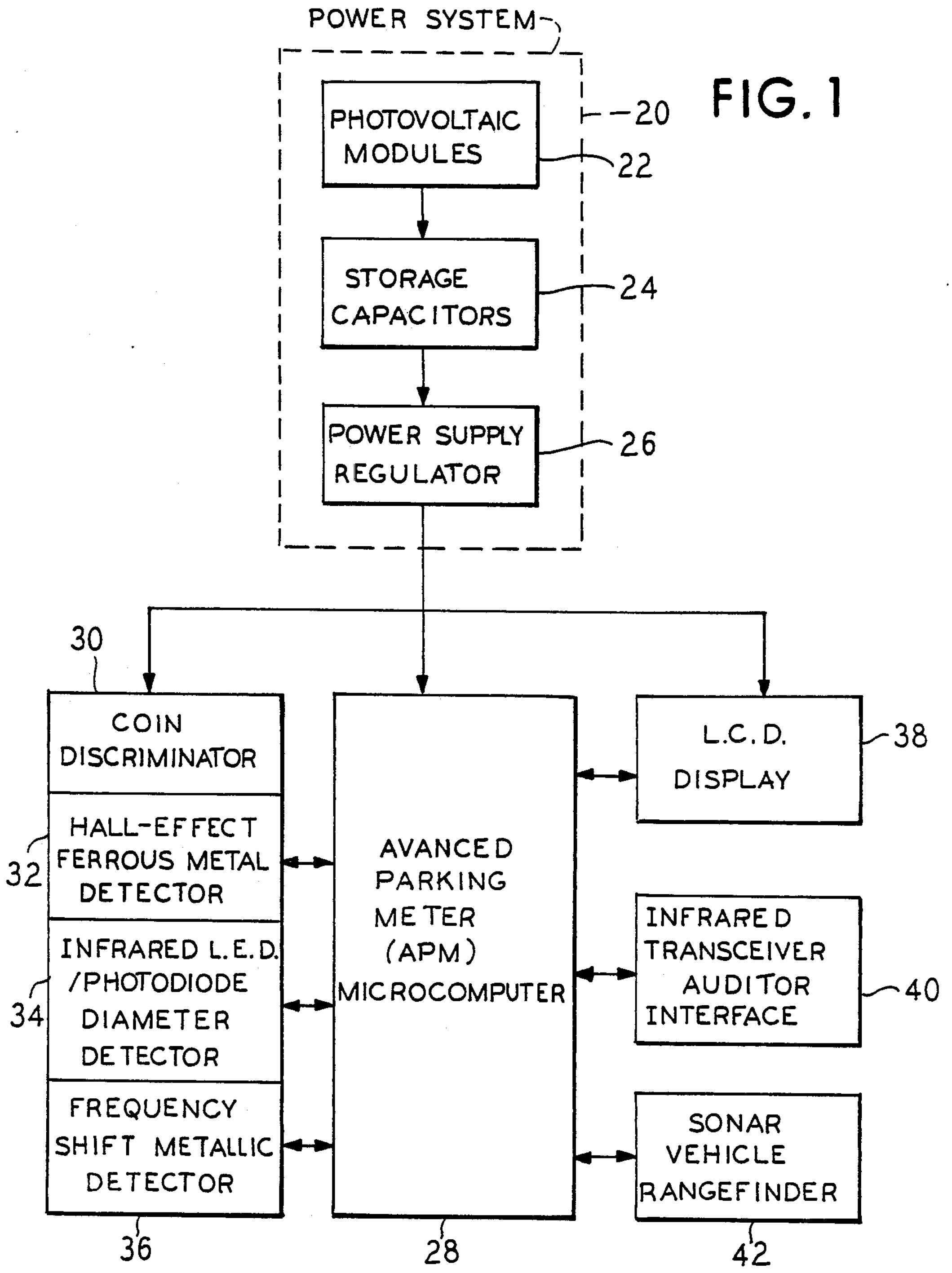
FIG. 1 is a general block diagram of the electronic parking meter system.

FIG. 1 shows a general block diagram of the electronic parking meter system. A power supply 20 has, in the preferred embodiment, solar cell arrays 22 for providing a cell voltage to a series of storage capacitors 24. The cell voltage causes the storage capacitors to be charged to the capacitor voltage. A power supply regulator 26 is connected to the storage capacitors 24 and provides the regulated voltage for use by the electronic parking meter components.

Central to the electronic parking meter is a microprocessor 28. The microprocessor 28 is connected to a coin discriminator 30 which sends a signal to the microprocessor when a coin is received by the meter. The microprocessor 28 then receives the signal from three coin detectors 32, 34 and 36 which identify the type of coin received by th meter. The detector 32 in the preferred embodiment detects any ferrous metal content of a coin using a Hall-effect ferrous metal detector. The diameter of a coin is detected by an infrared LED and photodiode system 34. The metallic content of the coin is detected by a frequency shift metallic detector 36. After the microprocessor 28 has determined the type of coin deposited and identifies it as a valid coin, the microprocessor 28 displays the pertinent information in a liquid crystal display unit 38.

As discussed above, an auditor having an infrared transceiver 40 may be interfaced with the microprocessor 28 of the electronic parking meter. Also, a sonar range finder 42 may be connected to the microprocessor 28.

Figure 2:
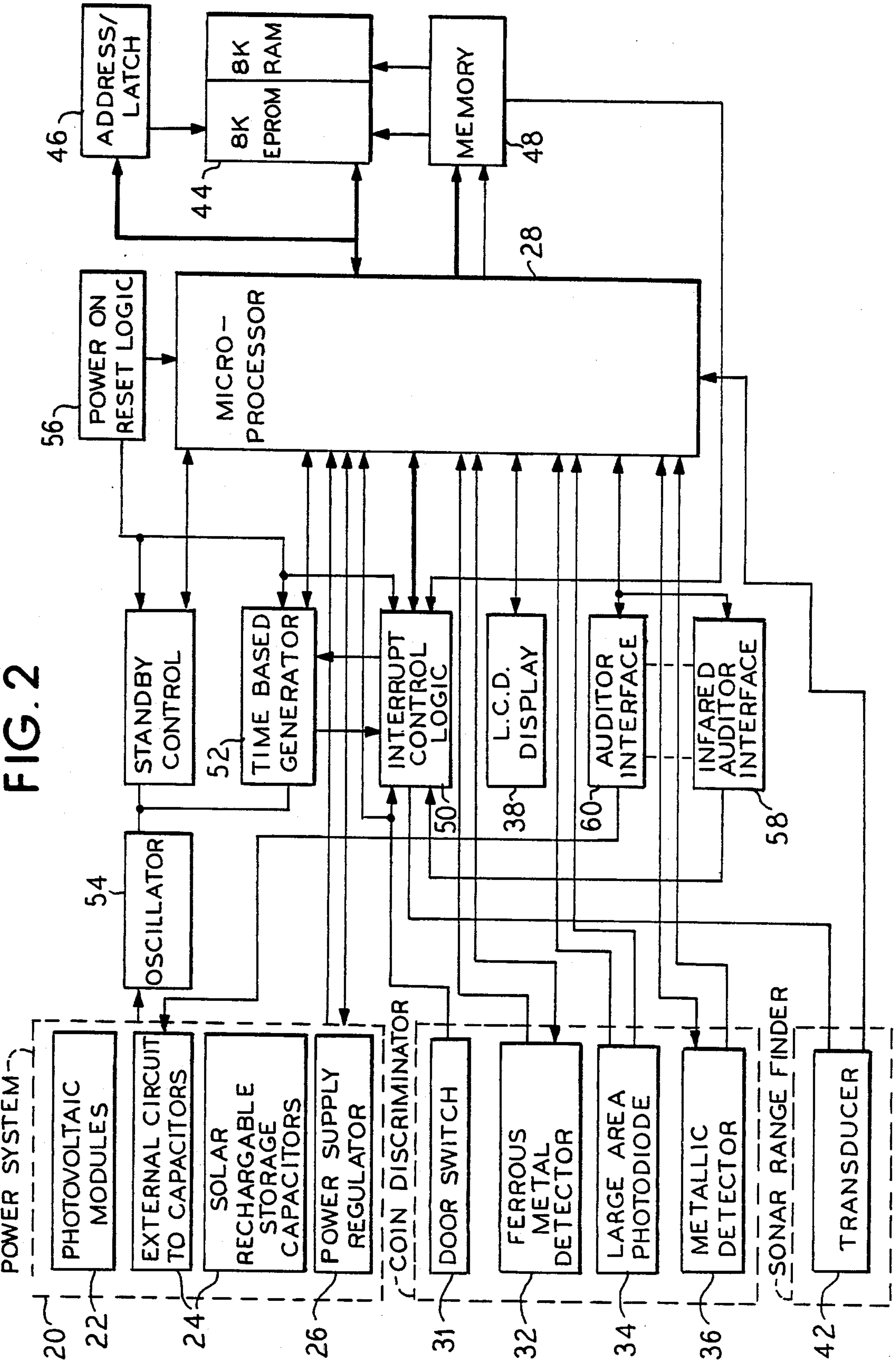
FIG. 2 is a more detailed block diagram of the FIG. 1 electronic parking meter system.

FIG. 2 shows a more detailed block diagram of the FIG. 1 meter. As is known in the art, the microprocessor 28 may have an appropriate memory 44 connected to it with associated address and latch registers 46 and read/write and address decode logic 48. Interrupt control logic 50 is provided to the coin signal from the coin signal generator 31 and is connected to the microprocessor 28. When the coin signal is received by the interrupt control logic 50, it causes the microprocessor 28 to enter the operational mode from the standby mode. Also, the time base generator 52 is connected to the interrupt control logic 50 and the microprocessor 28 is connected to the power supply 20 so that it receives a minimal amount of power in its standby mode. In addition, a fixed oscillator 54 is also connected to the power supply 20 and runs continously, even when the microprocessor 28 is in the standby mode. Power-on reset logic 56 is provided to place the microprocessor in the power-up mode when the meter is first placed in operation or if the meter has to be reprogrammed.

The standby oscillator control 55 is the electronic divider circuit which divide down the frequency of the fixed oscillator 54 to provide the microprocessor with its timing signal. The time base generator 52 provides a time signal when the meter is running for the microprocessor 28 to periodically be placed in the operational mode from the standby mode and update the display 38.

The coin signal generator 31 may be a door switch, which is a normally closed magnetic reed switch. Depositing a coin causes the reed switch to open thereby providing the coin signal.

As shown in FIG. 2, the auditor may have the infrared interface 58 or may have a direct connection 60 with the meter. In the direct connection embodiment 60, the auditor also has a connection to the power supply 20 for charging the storage capacitors 24 therein, as well as, providing immediate power to the microprocessor 28 when necessary.

Figure 3:
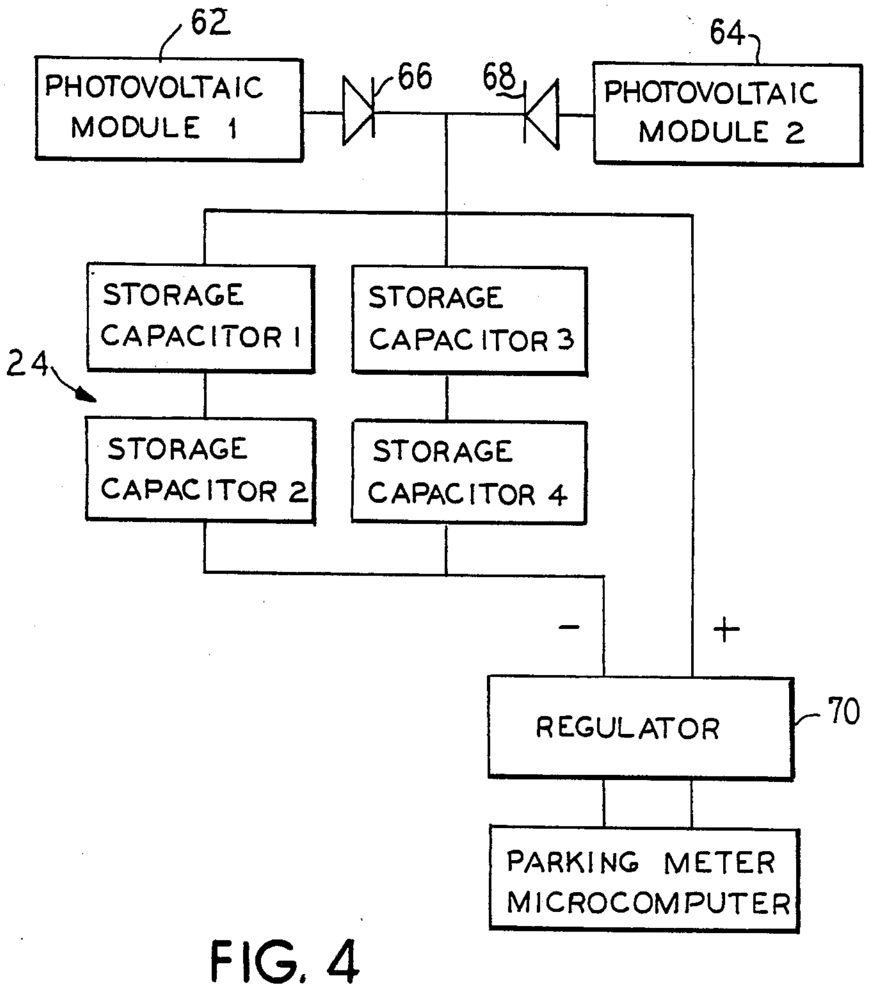
FIG. 3 is a general block diagram of a solar power supply used in the FIG. 1 meter.

FIG. 3 shows a more detailed block diagram of the power supply 20. The power supply 20 has first and second solar cell arrays 62 and 64 which are connected by low leakage blocking diodes 66 and 68 to storage capacitors 24. In the preferred embodiment, at least first and second series connected storage capacitors 24 are connected to the solar cell arrays 62 and 64. The voltage both from the storage capacitors 24 and from the solar cell arrays 62 and 64 is applied to the regulator circuit 70.

Figure 4:
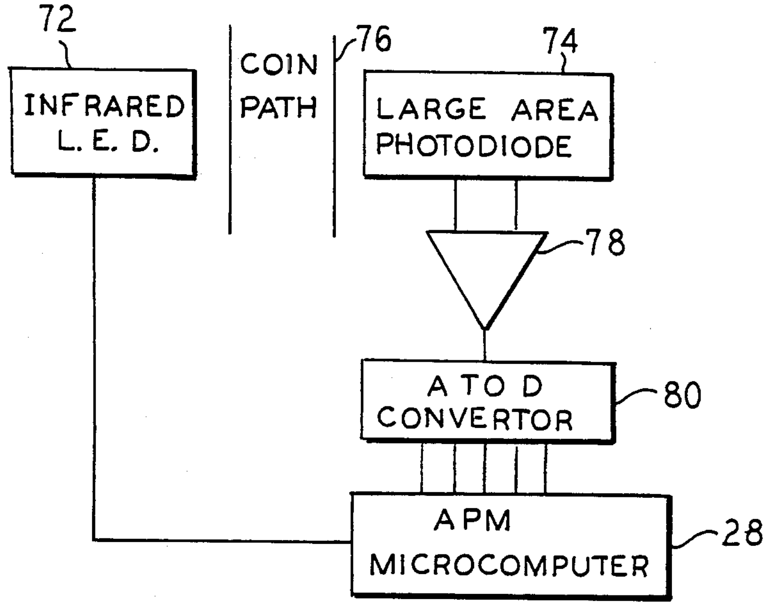
FIG. 4 is a general block diagram of a coin diameter detector used in the FIG. 1 meter.

FIG. 4 shows in general block diagram form the infrared LED/photodiode diameter detector 34 for detecting the diameter of a coin. The coin falls past the infrared light emitting diode 72 and past the large area photodiode 74 along the coin path 76. The microprocessor 28 has been programmed such that the output of the photodiode 74, which is connected to an operational amplifier 78, is converted from an analog to a digital signal by converter 80, identifies the type of coin by its diameter.

Figure 6:
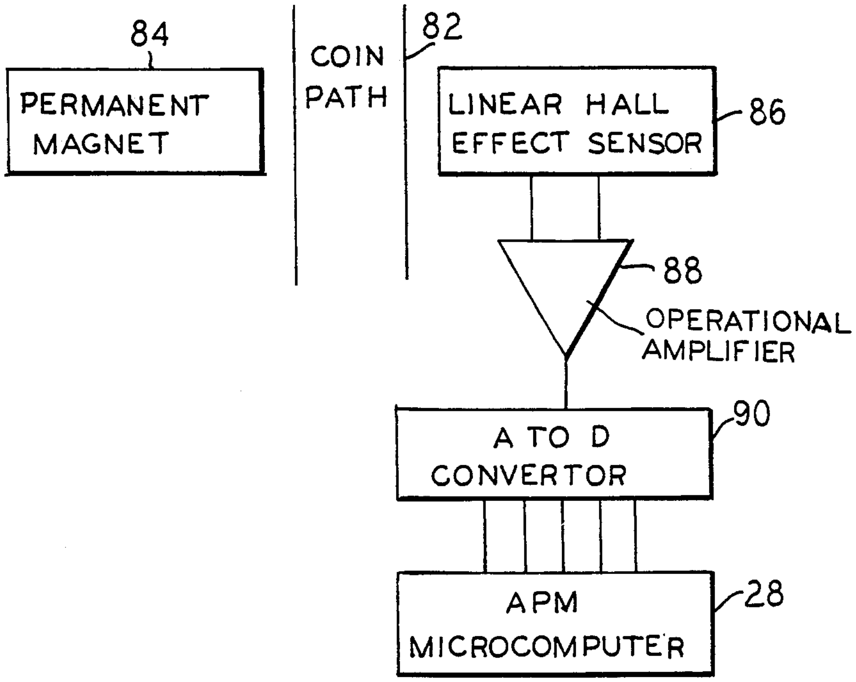
FIG. 6 is a general block diagram of a Hall-effect ferrous metal detector used in the FIG. 1 meter.

FIG. 6 shows in general block diagram form the Hall-effect ferrous metal detector. As the coin follows coin path 82, it falls between a permanent magnet 84, and a linear Hall-effect sensor 86, which outputs a signal to an operational amplifier 88, which is connected to an analog-to-digital converter 90. The signal from the converter 90 is received by the microprocessor 28 and the microprocessor 28 has been programmed to recognize signals which represent valid coins.

Figure 5:
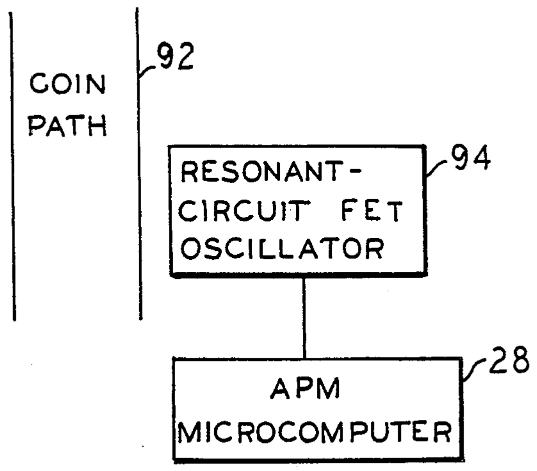
FIG. 5 is a general block diagram of a frequency shift metallic detector used in the FIG. 1 meter.

FIG. 5 is a general block diagram of the frequency shift metallic detector which recognizes whether the coin has a metallic content or not. The coin falls along the coin path 92 and influences the resonant field effect transistor circuit oscillator 94 which outputs a representative signal to the microprocessor 28 from which the microprocessor 28 can identify if the coin is metallic.

Figure 7:
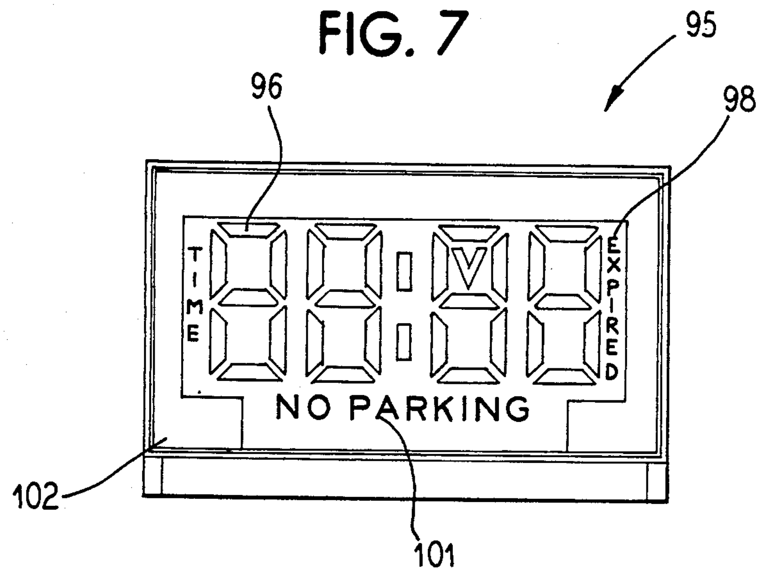
FIG. 7 is a plan view of the LCD display device used with the FIG. 1 meter.

FIG. 7 shows a preferred embodiment of the liquid crystal display 95 of the liquid crystal display unit 38 utilized in the electronic parking meter of the present invention. The display 95 has the standard liquid crystal arrangement for displaying numbers 96. Furthermore, various information such as time expired 98, and no parking 100 can also be activated and displayed. In addition, the border 102 of the display can be activated to signal a time expired, for example.

Figure 10:
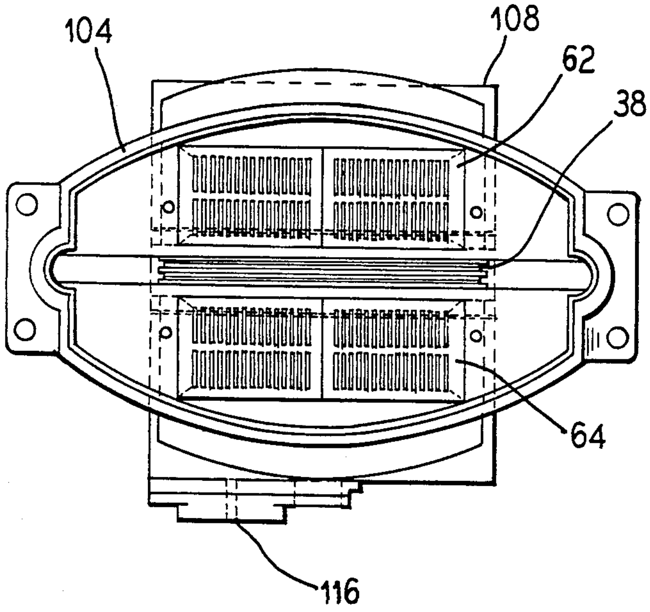
FIG. 10 is a top view of the FIG. 8 meter.
Figure 9:
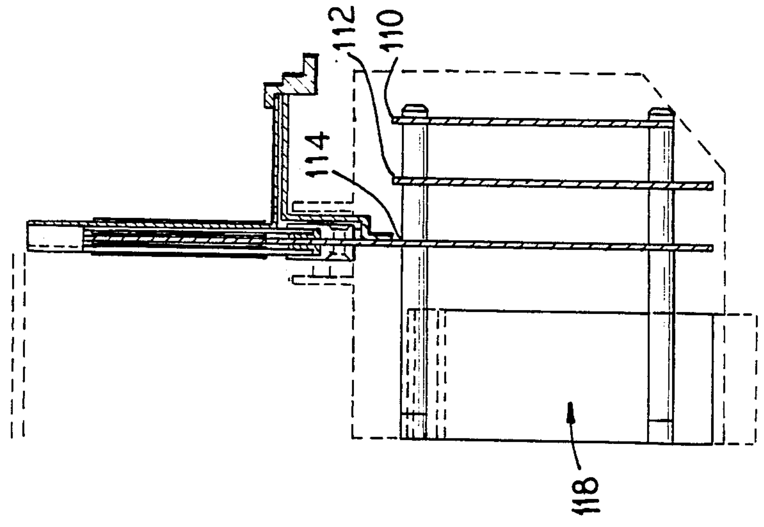
FIG. 9 is a side view of the interior portions of the FIG. 8 meter.
Figure 8:
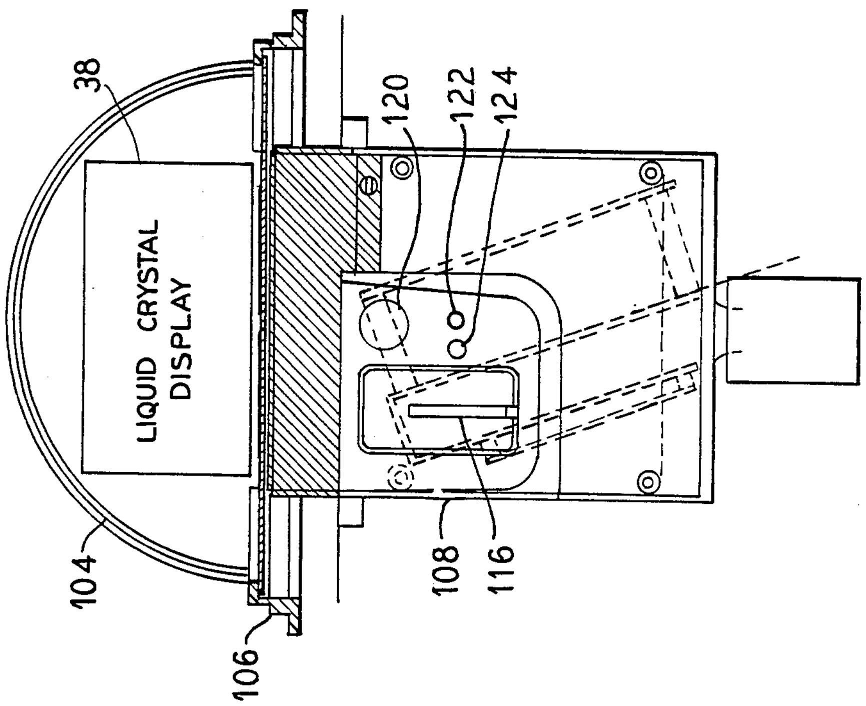
FIG. 8 is a front side view of the housing for the FIG. 1 meter.

FIGS. 8, 9 and 10 show various views of the parking meter and its internal physical construction. As can be seen in the FIGS., the liquid crystal display 38 is visible through a transparent dome 104 which is attached to the top support member 106 of the meter. A housing for the meter 108 contains electronic circuit boards 110, 112 and 114. A coin slot 116 is provided in which the coin is placed and falls down a coin chute 118 past the coin detector. An aperture 120 is provided on the front of the housing and contains the infrared transmitter and receiver elements for interfacing with the hand-held auditor. In addition, the sonar range finder transmitter and receiver transducers 122 and 124 may be incorporated into the front of the housing 108.

Located on either side of the liquid crystal display 38 are the solar cell arrays 62 and 64. They are exposed to sunlight through the transparent dome 104. The solar cell arrays 62 and 64 are placed on either side of the liquid crystal display 38 to optimize their exposure to sunlight.

Figure 11:
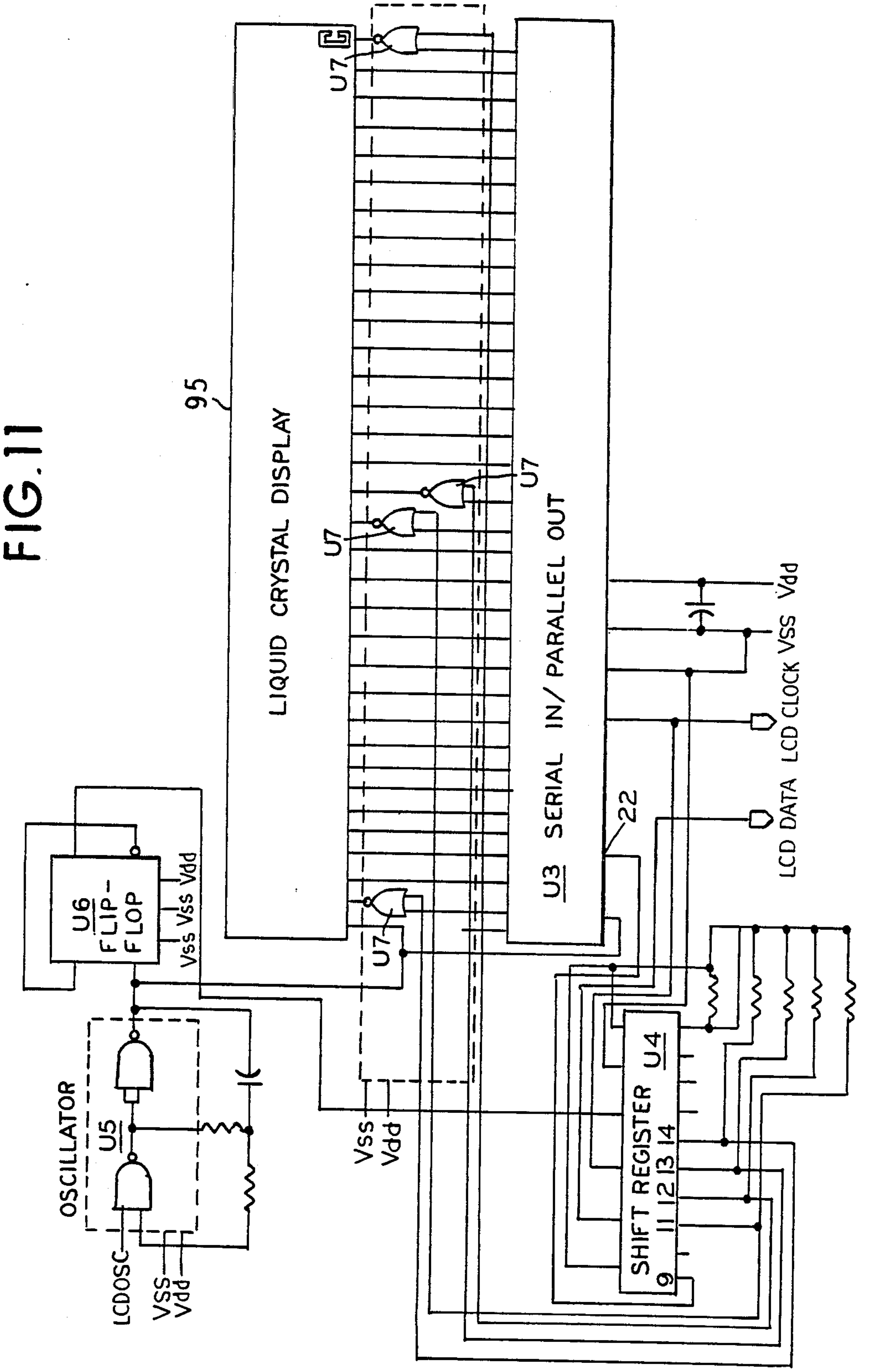
FIG. 11 is a circuit schematic for the liquid crystal display device used in the FIG. 1 meter.

Included with the liquid crystal display unit 38 is an associated electronic circuit shown in FIG. 11. Connected to the liquid crystal display 38 is a serial in/parallel out integrated circuit, u3, which provides the connections to each of the elements of the liquid crystal display. The integrated circuit u3 receives its data on input 22 which is connected through a shift register u4 to the microprocessor 28 on the input designated LCD DATA. Also received from the microprocessor 28 on the input designated LCD CLOCK is an appropriate timing signal for clocking the integrated circuit u3 and the shift register u4. In general, elements of a liquid crystal display are activated by signals appearing on pin 9 of the shift register u4. However, it is also possible to be activated in the flashing mode selected items in the liquid crystal display 95, such as time expired, the colon, no parking, or the border. Each of these selected elements in the display 95 is connected to one of pins 11 through 14 in the shift register u4 and to an oscillator circuit comprising oscillator u5 and a flip-flop u6. The oscillator u5 receives an input signal on the input LCDOSC from the microprocessor 28. The oscillator u5 is then activated and then runs flip-flop u6 which provides an output to the liquid crystal display 95 which in conjunction with exclusive-OR gates u7 causes the selected element to flash, even when the microprocessor 28 is in the standby mode. In the preferred embodiment, oscillator u5 operates at 1Hz and flip-flop u6 functions as a divide by two counter. Thus, this feature allows the electronic parking meter to be placed into a mode which flashes no parking, for example. Since the microprocessor is in the standby mode, the current drain on the power supply 20 is kept to a minimum.

Figure 12:
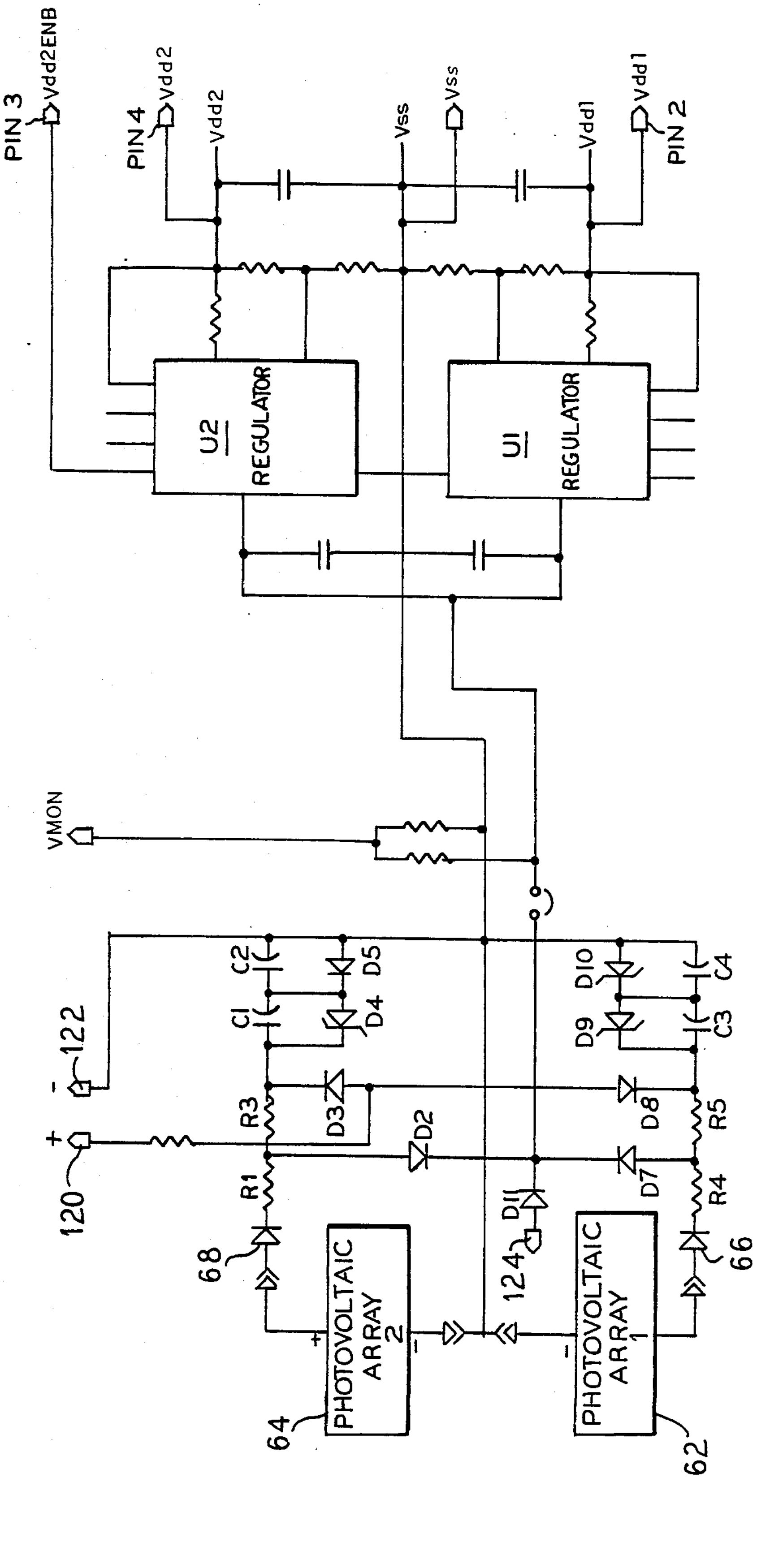
FIG. 12 is a circuit schematic for the power supply used in the FIG. 1 meter.

FIG. 12 shows a schematic circuit for the power supply 20. Solar cell arrays 62 and 64 have their negative terminals connected together and have associated low leakage blocking diodes 66 and 68. Capacitors C1 and C2 are connected in series between the positive terminal of array 64 and its negative terminal. Similarly, capacitors 63 and 64 are connected in series between the positive terminal of the array 62 and its negative terminal. The arrays 62 and 64 are essentially connected in parallel for charging the capacitors. Zener diodes D4, D5, D9 and D10 are connected across the capacitors C1, C2, C3 and C4, respectively, to provide for even charging of the capacitors. This provides that if one capacitor in the series charges to its preset maximum capacitor value before the other capacitor does, the Zener diode on the first capacitor will begin conducting allowing the second capacitor to fully charge without overcharging the first one. Resistors R1, R3, R4 and R5 are supplied in the circuit to connect the solar cell arrays 62 and 64 to the capacitors C1 through C4. These resistors provide that current may flow not only to the capacitors from the solar cell array 62 and 64, but also may flow to the regulators U1 and U2 so that the electronic parking meter may be energized directly from the solar cell arrays 62 and 64. This is advantageous, for example, when the meter has completely discharged capacitors when the meter is first put out into sunlight. The meter will then be able to begin operation immediately while the capacitors are being charged by the solar cell arrays 62 and 64. In addition, terminals 120 and 122 may be utilized to be connected to an external source of power for quick charging the capacitors C1 through C4, as well as, simultaneously powering the electronic parking meter. Also, the terminal 124 may be supplied for connection to an auxillary battery for supplying power. Diodes D2, D3, D7, D8 and D11 function as appropriate blocking diodes for current flow.

Unregulated DC voltage from the capacitors C1 through C4, as well as from the solar cell arrays 62 and 64, are supplied to two regulators U1 and U2. These regulators generate regulated voltage for use by the electronic parking meter. The regulator U1 is utilized to supply regulated voltage to the microprocessor 28 on pin 2, $V_{DD1}$. U2 supplies regulated voltage on pin 4, $V_{DD2}$ to peripheral items such as the coin detectors 32, 34 and 36. U2 has an input pin 3, $V_{DD2ENB}$ upon which a signal may be received from the microprocessor 28 to turn the regulator U2 on and off. Thus, the power may be removed from the coin detectors 32, 34 and 36, as well as any other selected peripheral device, when the microprocessor 28 is in a standby mode. Once the microprocessor 28 enters the operational mode, a signal is sent to regulator U2 which turns on the power to the peripheral items.

Figure 13:
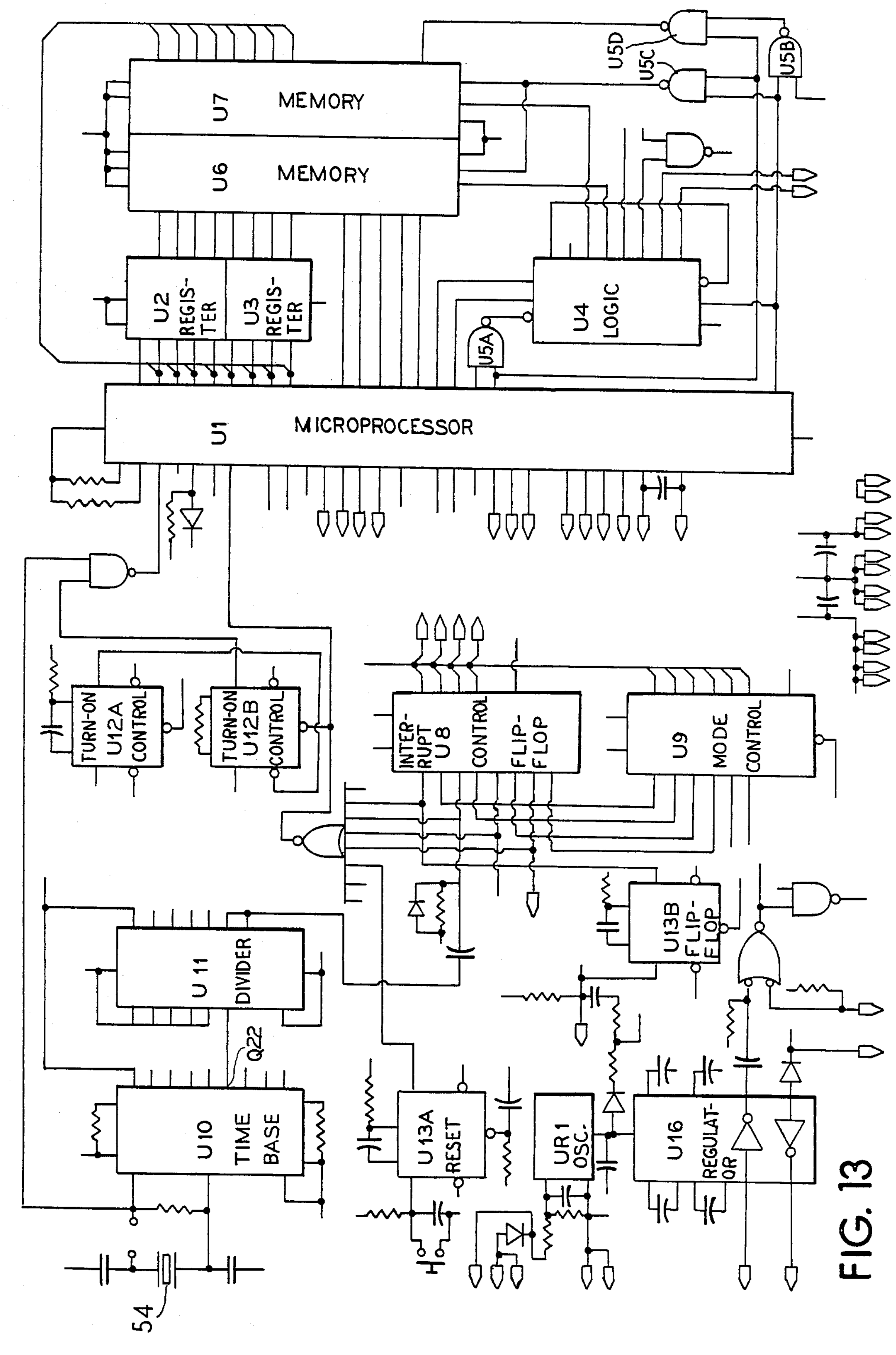
FIG. 13 is a circuit schematic of the microprocessor associated circuitry used in the FIG. 1 meter.

FIG. 13 shows a detailed schematic diagram of the electronic parking meter exclusive of the power supply 20 and the liquid crystal display unit 38. Central to the electronic parking meter is the microprocessor U1 and its associated memory units U6 and U7 connected to the processor U1 through address and latch registers U2 and U3 and the memory read/write and address decode logic, U4 and U5A through U5D. In the preferred embodiment, the microprocessor utilized is a Motorola computer, MC 68 HC 118, which has the features of a power saving stop and wait modes, and 8 Kbytes of ROM, 512 bytes of EEPROM, and 256 bytes of static RAM.

The oscillator 54 is a 1.048576 MHz oscillator and is utilized to operate the electronic parking meter. The oscillator runs continously, although it is provided through U10 with a reset mode. The reset mode of U10 corresponds to the standby mode of the microprocessor 28, such that although the oscillator 54 is running continously, the internal dividers in the circuit U10 are disconnected so that only approximately 20 Microamps are necessary to operate the oscillator 54. The divider U10 provides the time base on output Q22 which is divided again by U11 to give approximately a 30 second delay or one minute interrupts. The output of U11 then goes to the interrupt control logic U8. U8 also receives signals from the coin signal generator which then causes the interrupt control logic U8 to send a signal to the microprocessor U1 to place it in an operational mode. U8 essentially operates as a flip-flop.

U13a is the reset circuitry which when activated to the power-up mode, causes reset signals to be supplied to the system and also turns on the oscillator 54 in conjunction with U10 and U11. Furthermore, the reset logic circuit U13*a* causes the flip-flop U8 to place the microprocessor U1 in a power-up mode. During the power up mode, the microprocessor U1 may run diagnostic checks and place the parking meter in condition for operation after which the microprocessor U1 will go into the standby mode. After the appropriate signals are received at U9, the output of U9 is utilized to place the microprocessor U1 in the standby mode. In the standby mode, the microprocessor U1 in the preferred embodiment draws approximately 40 microamps with its associated logic circuitry from the power supply 20.

In the operational mode, after a coin has been deposited, the microprocessor U1 receives signals from the coin detectors. One coin detector, the linear Hall-effect ferrous metal detector 32 is a differential amplifier device that gives an output proportional to the magnetic field which influences it. Thus, a slug or washer, for example, can be identified because it will disrupt the magnetic field around the detector 32. Similarly, the signals from the diameter detector 34 and the metallic content detector 36 are also supplied to the microprocessor U1. During the time the coin passes these detectors, the microprocessor is constantly scanning. The microprocessor in the preferred embodiment samples the detectors approximately every 50 microseconds. Since the coin takes approximately 20 milliseconds to fall past a detector, each detector thereby supplies thousands of signals to the microprocessor. The microprocessor is therefore able to perform appropriate analysis of the signals for identifying the coin. The diameter detector has its infrared light emitting diode turned on for approximately 25 microseconds after which it is shut down and the information is conveyed to the microprocessor U1. This turning on and off of the detector continues to supply information to the microprocessor U1 to identify the coin diameter. The frequency shift metal detector is essentially a phase lock loop oscillator such that a metallic object will cause a phase shift in the frequency or the base line frequency and supply a signal to the microprocessor U1. The information from the three detectors is thus suitable for identifying a valid coin which is metallic, although not ferrous metallic and has a proper diameter.

Numerous types of sonar range finders are available and as one example, air ultrasonic transducers made by Projects Unlimited have a frequency range up to 60 KHz and come in various diameters up to 25 mm. As was described, the receiver and transmitter transducers 122 and 124 in FIG. 8 can be mounted in a side-by-side relationship and connected to appropriate transmitting and receiving circuits, such as Texas Instrument circuits type SN28827 or Texas Instrument sonar ranging control circuits type TL851 and TL852. Obviously, any other type of sonar range finder could be used in the electronic parking meter. The circuits are then connected to the microprocessor 28. When the microprocessor 28 is in an operational mode, the sonar range finder is turned on and sends a signal to the microprocessor 28 which indicates the presence or absence of a vehicle in the parking space associated with the electronic parking meter. When the vehicle is no longer detected in the associated parking space, the microprocessor 28 may return the timing circuit to zero in the meter. In operation, the microprocessor 28 may be placed in the operational mode only intermittently while the timing function is occuring, thus, using the sonar range finder to sample only during certain periods for the presence or absence of the vehicle.

Figure 15:
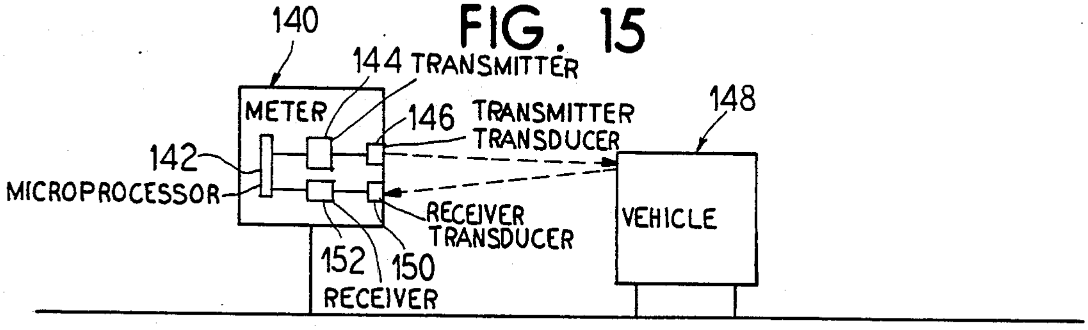
FIG. 15 is a schematic diagram of a sonar range finder used with the FIG. 1 meter.

As schematically depicted in FIG. 15, the electronic parking meter 140 has the microprocessor 142 which activates the sonar transmitter circuit 144. Transmitter transducer 146 then outputs the sonar signal which is reflected from vehicle 148. The echo is received by receiver transducer 150 which is connected to the receiver circuit 152. The receiver circuit 152 determines the presence or absence of the vehicle 148 from the echo signal and, if desired, can determine the distance between the vehicle 148 and the meter 140. The receiver circuit 152 provides the appropriate signal to the microprocessor 142.

The auditor unit utilized with the electronic parking meter to form an electronic parking meter system may be a special unit or may be a hand-held general purpose computer. These devices are typically sufficient to program the parking meter and/or to extract the data from the parking meter.

Figure 16:
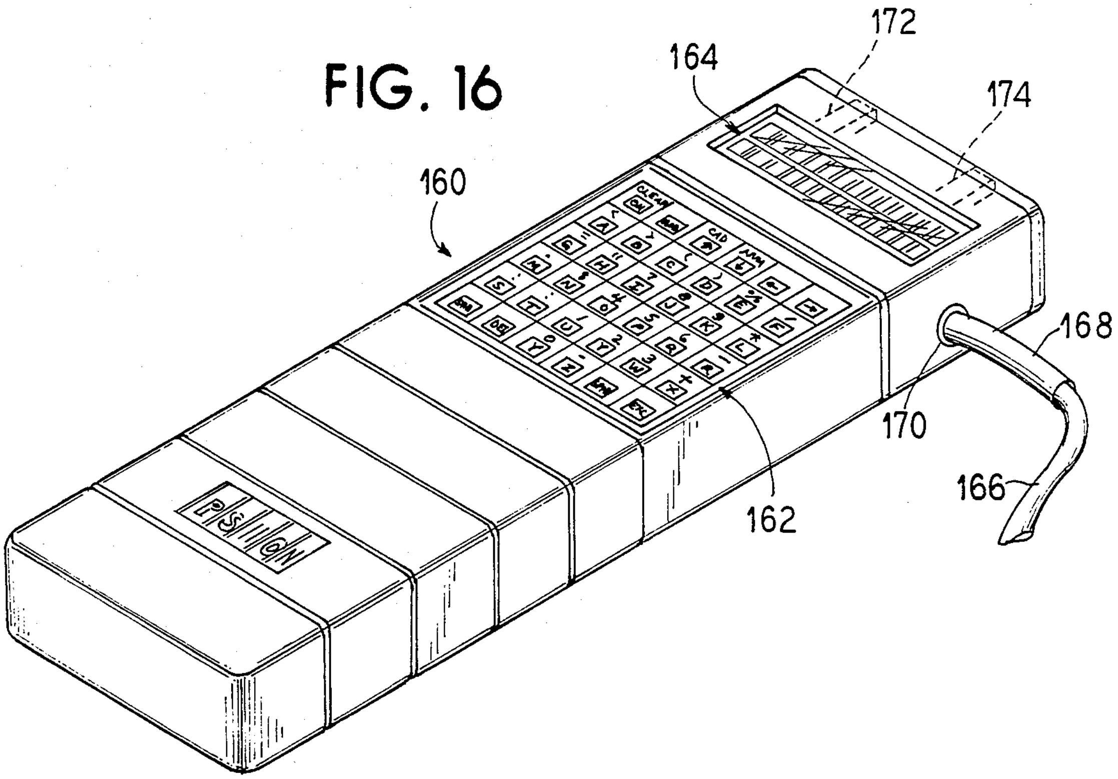
FIG. 16 is a perspective view of an auditor unit for use with the FIG. 1 meter.

As shown in FIG. 16, the auditor 160 may have a keypad 162 for entry of information and a display 164. A cable 166 and plug 168 connect to socket 170 and provide direct connection between the auditor 160 and the meter. Alternatively, infrared transmitter 172 and receiver 174 may be utilized to interface with the meter.

Shown in FIGS. 14A and 14B, is a credit card type structure, which has a thin plastic or cardboard type body 130 on which information regarding the amount of parking time may be supplied in various forms, such as bar code 132, embossed symbols 134 or magnetic strip 136. The "park card" may be inserted into the electronic parking meter which has a device for appropriately reading the information stored on the park card. The card may be left in the meter until the liquid crystal display of the meter indicates the amount of time which the customer desires. As the card is removed, the meter would cause the card to be marked such that a certain amount of time has been used up from the card. Thus, at some point in time, the card would be completely used and would thereby be discharged. Obviously, it is envisioned that other types of charge card approaches could be utilized with the electronic parking meter. Thus, it should be understood that although in the preferred embodiment, the electronic parking meter receives a coin, the same function of the parking meter can be achieved with only minmal revisions in structure to accept, not only coins, but also paper money, normal charge cards or the above described "park card". Thus, in this disclosure the word, "coin" should be understood to also mean payment elements, such as paper money, credit cards, special "park cards", etc.

Figure 17:
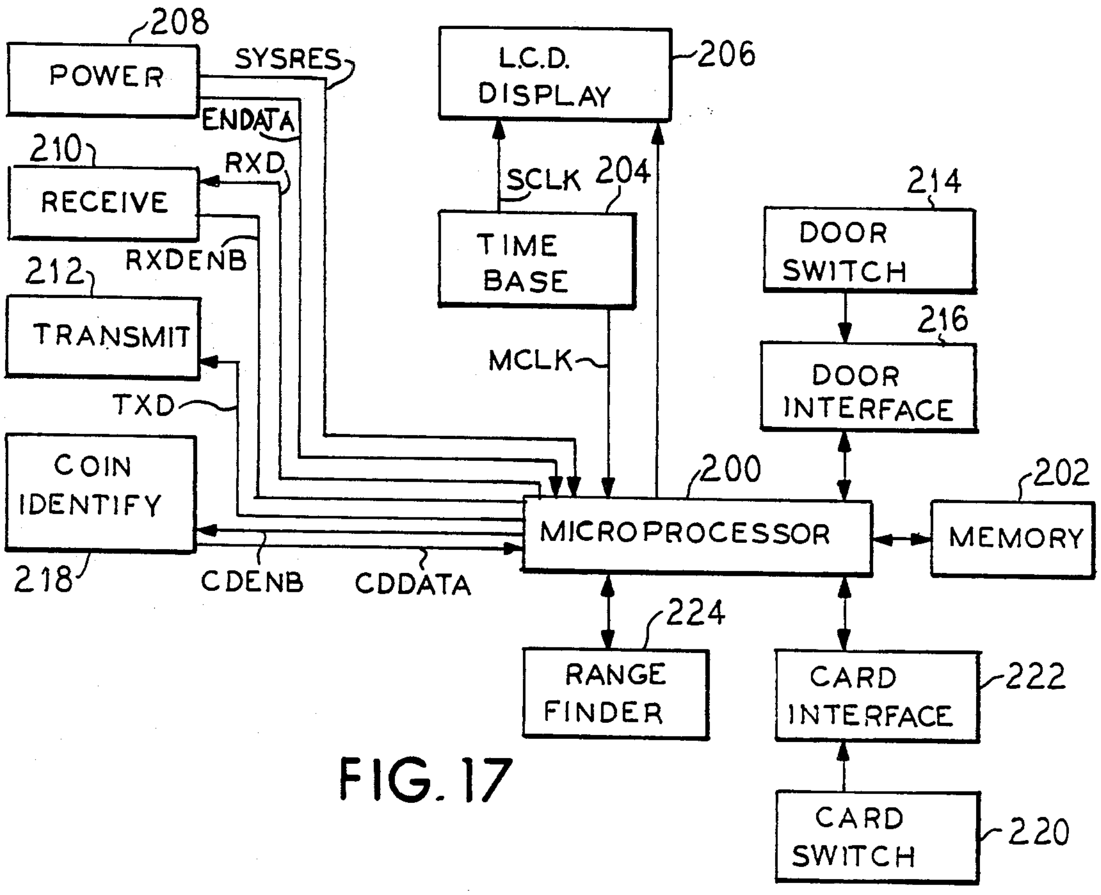
FIG. 17 is a general block diagram of an alternative embodiment of the electronic parking meter.

FIG. 17 shows in general block diagram of an alternative embodiment of the present invention. In this embodiment, the electronic parking meter has a microprocessor 200 connected to a memory 202. Time base circuitry 204 provides the timing for the electronic parking meter and supplies on a line MCLK one minute pulses to the microprocessor 200. The time base 204 also provides one second pulses on a line SCLK which is connected to the LCD display 206. The microprocessor 200 provides data to the LCD display 206 for displaying information as will be explained below. A solar power supply 208 provides power for the entire electronic parking meter (not shown in FIG. 17). In addition, the microprocessor 200 monitors the power voltage level in the solar power supply 208 on line ENDATA and also receives a reset pulse on line SYSRES when the solar power supply is first turned on.

Infrared auditor receiver circuitry 210 is connected to the microprocessor 200 on receive data line RXD and receive enable line RXDENB. Also, infrared auditor transmitter circuit 212 is connected to the microprocessor 200 on line TXD. These circuits 210 and 212 allow the electronic parking meter to interface with the hand-held auditor as described above. When a coin is inserted into the electronic parking meter, a door switch 214 is activated and through door interface circuitry 216 causes the microprocessor 200 to change from standby mode to operational mode. The coin discriminator 218 identifies the type of coin and interfaces with the microprocessor 200 on the coin discriminator enable line CDENB and the coin discriminator data line CDDATA.

The electronic parking meter may also be equipped to accept a park card as described above which activates a card switch 220 and through card interface circuitry 222 communicates with the microprocessor 200. Furthermore, the electronic parking meter may be equipped with a vehicle range finder 224 as described above.

Figure 18:
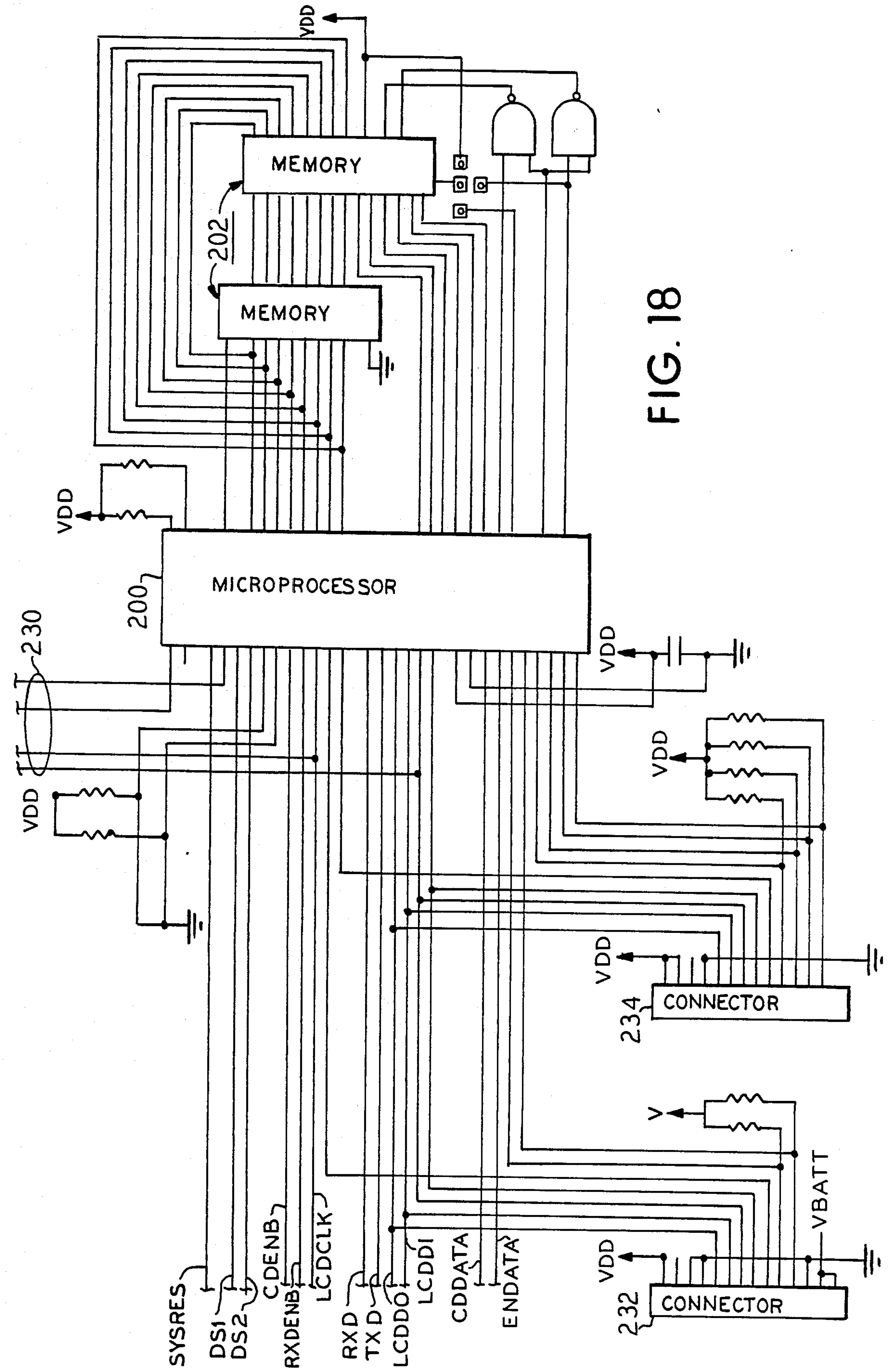
FIG. 18 is a circuit schematic of the microprocessor and the memory in the FIG. 17 embodiment.
Figure 19:
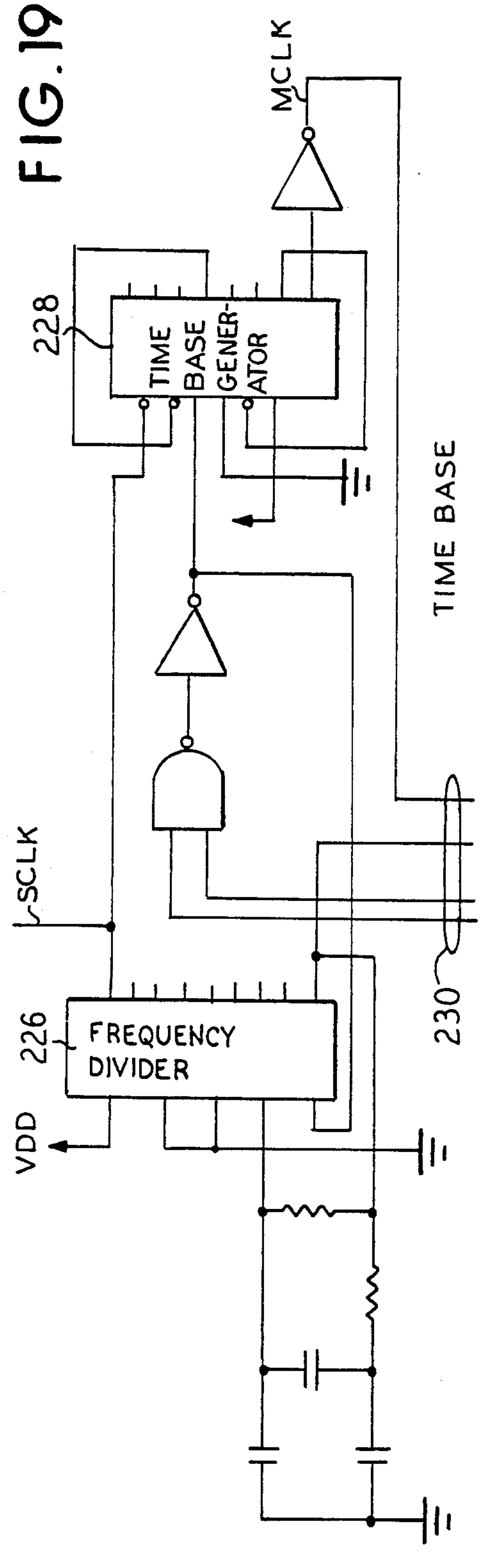
FIG. 19 is a circuit schematic of the time base in the FIG. 17 embodiment.

As shown in FIG. 19, the time base circuit 204 has a 24-stage frequency divider 226 connected to a time base generator 228. This provides for a one second pulse on line SCLK and a one minute pulse on line MCLK. The 24-stage frequency divider 226 may be a Motorola MC14521B integrated circuit and the time base generator 228 may be a Motorola MC14566B integrated chip. Line group 230 interface with the microprocessor 200 shown in FIG. 18. As shown in FIG. 18 in the present embodiment, the park card interface 222 connects to the microprocessor 200 through connector 232. The range finder 224 connects to the microprocessor 200 through the connector 234. The microprocessor 200 may be a Motorola MC68HC11A8 microcomputer and the memory 202 may be composed of Motorola integrated circuits HC373 and C64/C256.

Figure 23:
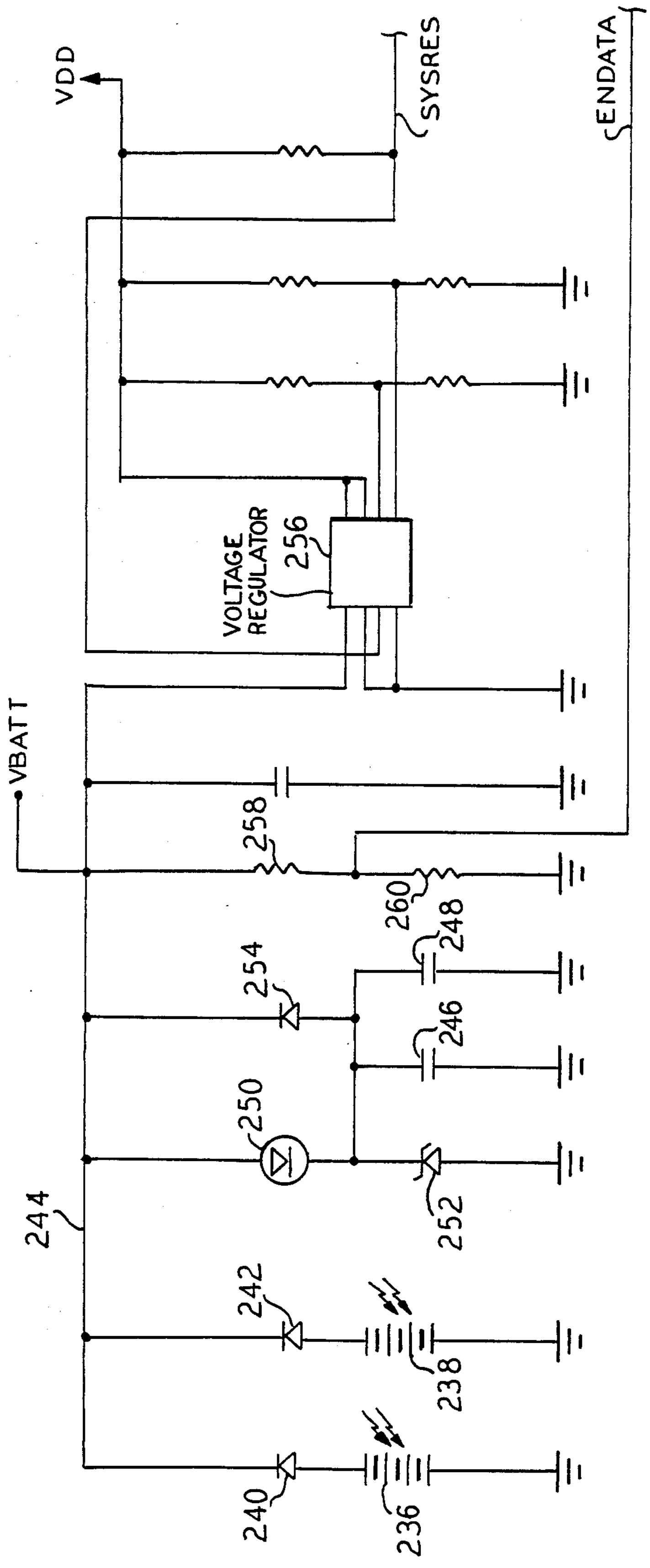
FIG. 23 is a circuit schematic of the solar power supply in the FIG. 17 embodiment.

The electronic parking meter is supplied with power from a solar power supply as shown in FIG. 23. A pair of solar arrays 236 and 238 are connected through diodes 240 and 242, respectively, to a power bus 244. A pair of storage capacitors 246 and 248 are connected through a current limiting diode 250 to the power bus 244. Zener diode 252 is connected across the storage capacitors 246 and 248 and prevents overcharging of these capacitors 246 and 248. Diode 254 connects the storage capacitors 246 and 248 to the power bus 244.

The solar arrays 236 and 238 supply current to the power bus 244 which current limiting diode 250 allows to flow for charging capacitors 246 and 248. The current limiting diode 250 allows the capacitors 246 and 248 to charge slowly, thereby preventing a significant voltage drop on the power bus 244 so that the electronic parking meter can operate simultaneously. The power bus 244 is connected to an input of a voltage regulator 256 which provides on an output thereof the regulated power supply voltage $V_{DD}$ for use by the electronic parking meter. The voltage regulator 256 may be, for example, a Maxim integrated circuit MAX666. The microprocessor 200 monitors the voltage level on the power bus 244 on line ENDATA which is connected to the juncture of resistors 258 and 260. When the voltage on the power bus 244 drops below a minimum threshold, for example, when there is a failure of the power supply 208 or if the solar cell arrays 236 and 238 are not charging and the charge from the storage capacitors 246 and 248 have been depleted, the microprocessor 200 will begin an orderly shutdown of the electronic parking meter before all voltage on the power bus 244 is lost.

The microprocessor 200 is also connected to the solar power supply 208 along line SYSRES which provides a system reset signal from the voltage regulator 256. This voltage regulator 256 provides this signal when the parking meter is for example, placed initially into operation and as the voltage on the power bus 244 begins to build up the voltage regulator 256 waits until a threshold voltage level is reached before supplying the system voltage $V_{DD}$. When the voltage level has passed the threshold level, the voltage regulator 256 causes the microprocessor 200 by the signal on line SYSRES to change to the power-up mode and initiate the operation of the electronic parking meter.

Figure 20:
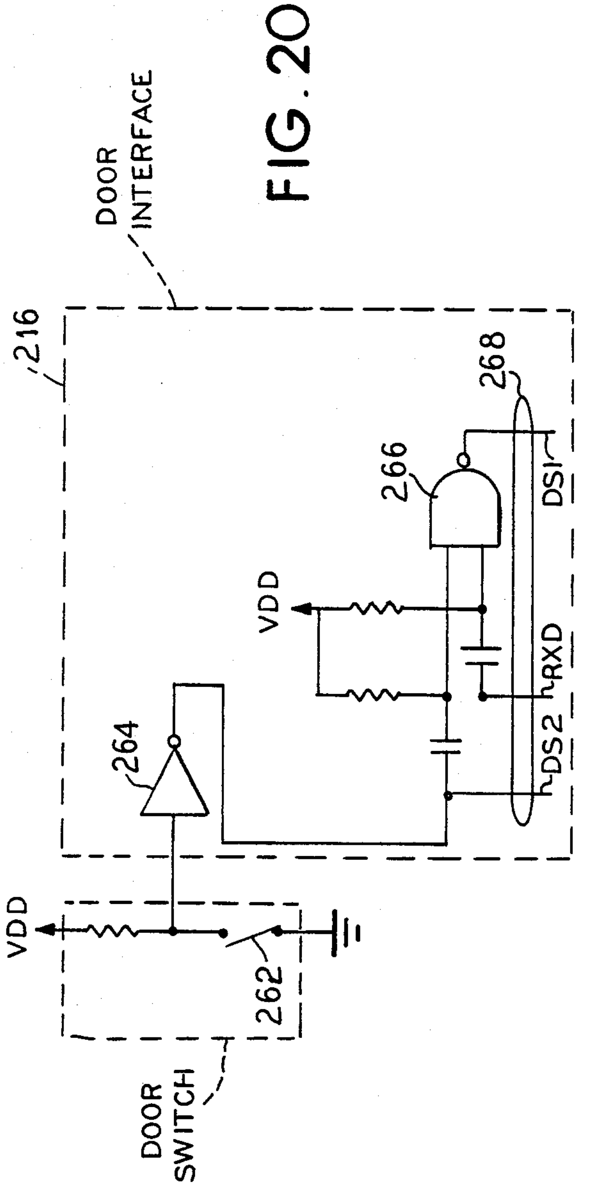
FIG. 20 is a circuit schematic of the door switch in the FIG. 17 embodiment.

When a coin is inserted into the electronic parking meter, a door switch 262 is activated and is shown in FIG. 20. The door interface circuitry 216 contains a Schmidt trigger 264 connected to the door switch 262 which in conjunction with the logic circuitry 266 provides the proper signals to the microprocessor 200 along line group 268.

Activation of the door switch 262 by the coin through the door interface circuitry 216 causes the microprocessor 200 to change from standby mode to operational mode and enable the coin discriminator circuit 218.

Figure 22B:
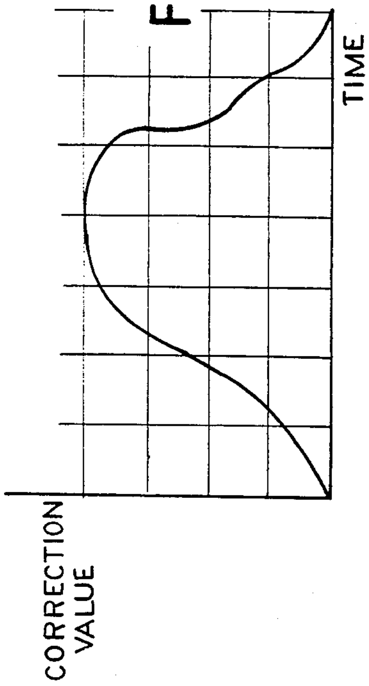
FIG. 22B is a graph depicting a phase lock loop correction signal unique to a coin type.
Figure 22A:
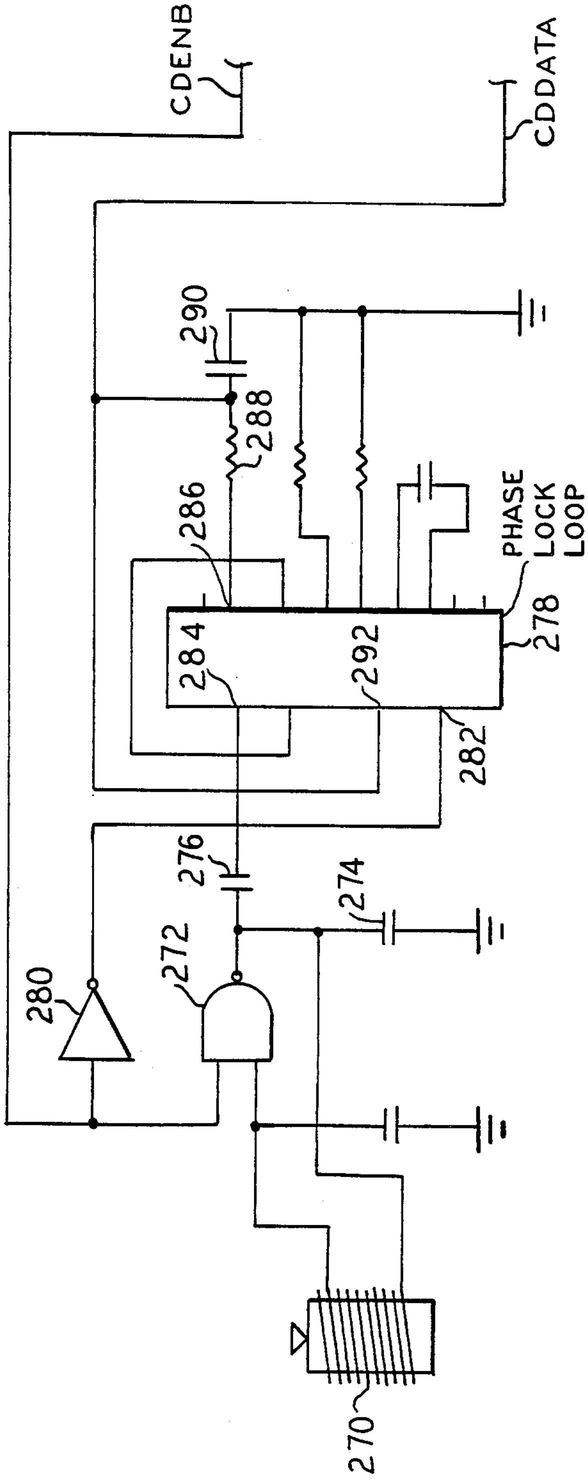
FIG. 22A is a circuit schematic of the coin discriminator in the FIG. 17 embodiment.

As shown in FIG. 22A, the coin discriminator circuit 218 has an inductor 270 through which the deposited coin passes inside the electronic parking meter. The inductor 270 is connected to one input of a NAND gate 272 with the other side of the inductor being connected to ground through capacitor 274. The output of the NAND gate 272 is connected through capacitor 276 to the input of an integrated phase lock loop circuit 278. The NAND gate 272 in conjunction with the inductor 270 and the capacitor 276 form an LC oscillator operating at a predetermined frequency.

The microprocessor 200 causes the coin discriminator circuit 218 to be enabled along line CDENB, which connects to the input of a Schmidt trigger 280 and to the other input of the NAND gate 272. The output of the Schmidt trigger 280 connects to the inhibit input 282 of the phase lock loop integrated circuit 278. The signal on the line CDENB, thus, activates the LC oscillator and the phase lock loop circuit. Frequency input 284 of the phase lock loop circuit 278 receives the frequency from the LC oscillator. Output 286 produces a series of pulses which are integrated through a low pass filter having resistor 288 and capacitor 290. A correction signal from the low pass filter is supplied back to input 292 of the phase lock loop circuit 278.

As a coin passes through the inductor 270, the frequency of the LC oscillator changes at the input 284. The correction signal from the low pass filter then changes to cause the phase lock loop 278 to stay in sync with the frequency 284. Thus, the correction signal has a unique wave shape for the type of coin which passes through the inductor 270. This correction signal is also connected to the microprocessor 200 along line CDDATA. The microprocessor 200 has stored in its memory 202 one or more wave shapes for known coins. The microprocessor 200 then compares the wave shape of the deposited coin to the wave shapes stored in its memory. When the microprocessor 200 substantially matches the wave shape of the deposited coin to one of the wave shapes in its memory, it has then determined that the coin is acceptable and has also identified the coin. If the wave shape of the deposited coin does not match any of the wave shapes stored in memory, the coin is rejected. The phase lock loop integrated circuit 278 may be a Motorola MC14046B.

FIG. 22B depicts a graph of the wave shape of the correction signal for a particular type of coin.

Figure 21:
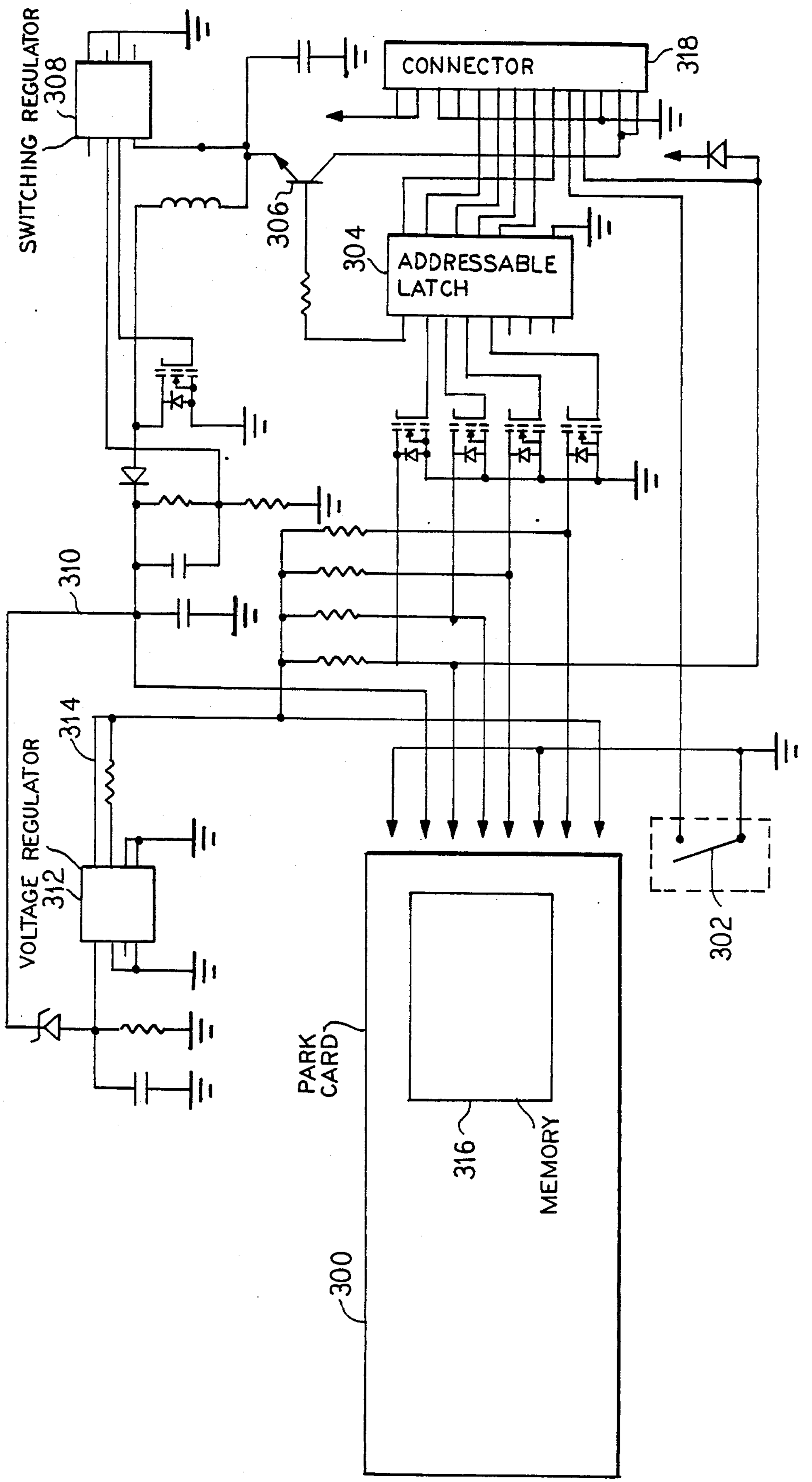
FIG. 21 is a circuit schematic of the park card switch and park card controller in the FIG. 17 embodiment.

If the electronic parking meter is equipped with the park card interface circuitry 222 as shown in FIG. 21, then a park card 300 may be inserted through the same coin slot which a coin would be deposited and activates a card switch 302. This causes the microprocessor 200 to change from the standby mode to the operational mode and enable the card interface circuit 222 through the 8bit addressable latch 304, which may be a Motorola MC14099B. This enables through transistor 306 a step-up switching regulator 308. In the present embodiment, 25 volts is provided on line 310 to a voltage regulator 312 which outputs a low voltage level of approximately 5 volts on line 314. The voltage regulator 312, may be for example, a Maxim MAX666 and the step-up switching regulator may be a Maxim MAX643.

The park card 300 uses a 416 bit EEPROM logic control access control memory 316, which may be a Thompson semiconductor TS1301. This electronically erasable programmable memory utilizes both the 5 volts from the voltage regulator 312 and the 25 volts from the step-up switching regulator 308. The microprocessor 200 interfaces with the memory 216 through the 8-bit adjustable latch 304. Thus, the microprocessor 200 may now subtract monetary units from the memory 316 in the park card 300 or perform any other function necessary or desirable. Connector 318 mates with the connector 232 shown in FIG. 18.

Figure 25:
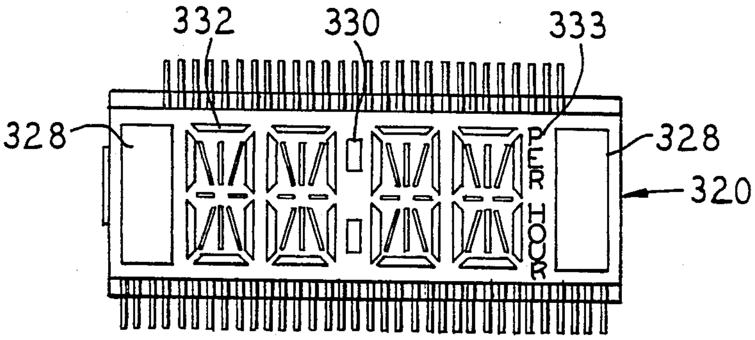
FIG. 25 is a plan view of an alternative embodiment of the LCD device.
Figure 24:
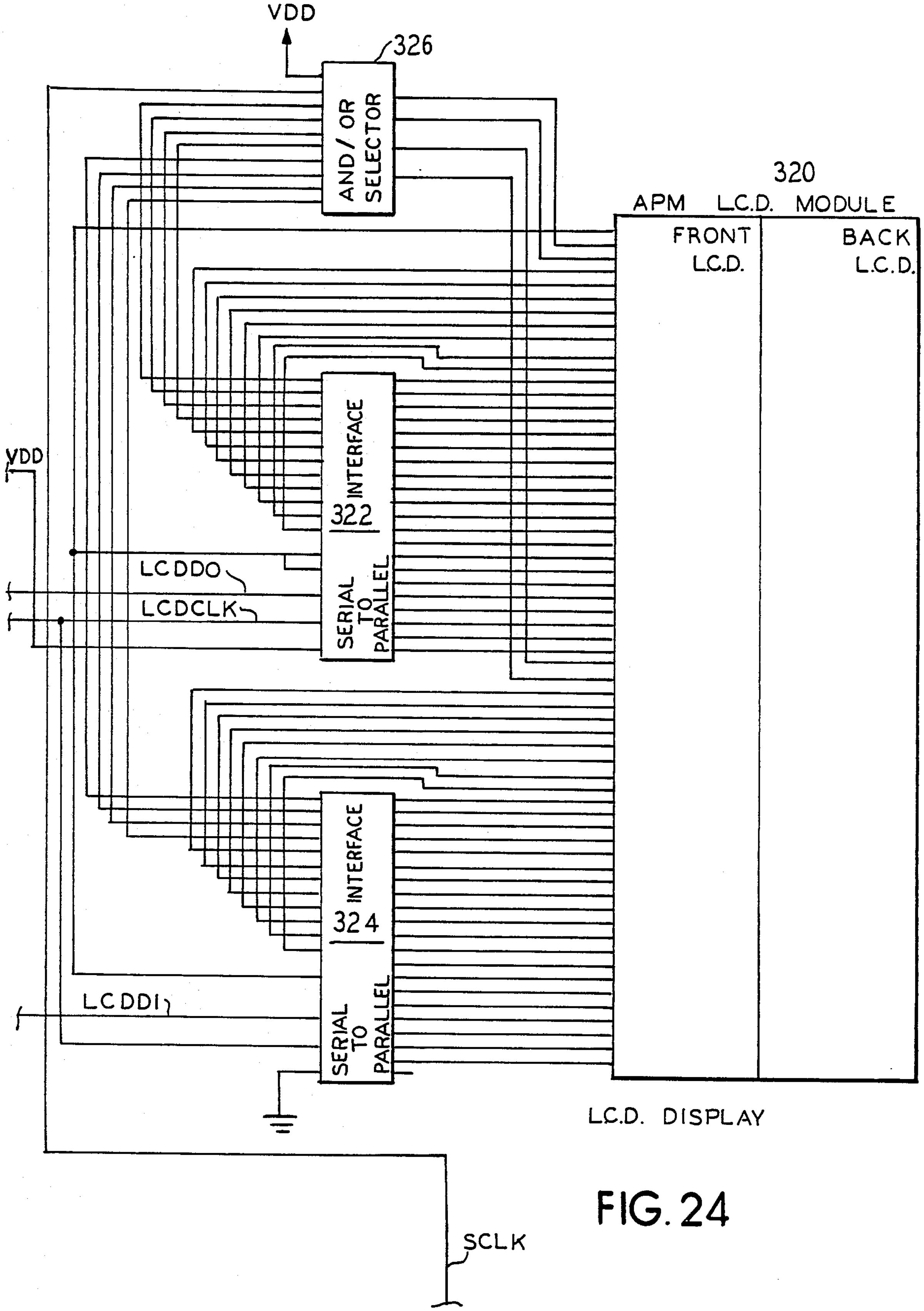
FIG. 24 is a circuit schematic of the microprocessor and LCD display in the FIG. 17 embodiment.

As shown in FIG. 24, the LCD display 320 of the electronic parking meter is interfaced to the microprocessor through 1st and 2nd LCD drivers with serial to parallel interfaces 322 and 324. The LCD display 320 is also shown in FIG. 25. Data is supplied from the microprocessor 200 to the drivers 322 and 324 over lines LCDD0 and LCDD1, respectively. The drivers 322 and 324 may be Motorola integrated circuits MC145453. A 4-bit and/or selector 326 is connected in circuit with the driver 322 and the LCD display 320. The selector 326 receives one second pulses from the time base circuit 204 on line SCLK. The selector circuit 326 is utilized for flashing a display or symbol section at one second intervals, for example, red side bars 328 shown in FIG. 25 may be flashed to represent a parking violation or for example, the colon 330 may be flashed to indicate seconds passing in time. The display as shown in FIG. 25 has four 14-segment sections 332 for displaying characters and a "per hour" section 333 which may be illuminated for displaying the price of parking. Other arrangements and configurations are also possible. The 4-bit and/or selector 326 may be a Motorola integrated circuit MC14519B.

A novel feature of the present invention is that the microprocessor 200 has stored in its memory 202 advertising messages. The microprocessor 200 then periodically displays the advertising message on the LCD display 320. That is, the microprocessor 200 selects the first four characters from the message contained in the memory 202 and displays them during a first time period and during subsequent time periods, increments the selection of characters from the message by one character so as to cause the message to be scrolled across the LCD display 320. The scrolling of the message across the LCD display 320 may alternated by the one minute pulses from the time base circuit 204 with displaying, for example, time remaining on the meter. This first time period may be determined by the internal clock function of the microprocessor 200. It can be appreciated that the advertising message can be displayed while the parking violation symbols 328 are flashing.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A solar power system in an electronic parking meter comprising:

at least one solar cell array connected to the anode of a first diode;

at least one current regulating diode having its anode connected to a cathode of said first diode;

at least one storage capacitor connected between a cathode of said current regulating diode and ground;

at least one second diode having its anode connected to said storage capacitor and its cathode connected to an input of a voltage regulator, an output of said voltage regulator providing a supply voltage for said electronic parking meter, said input of said voltage regulator also connected to said cathode of said first diode;

means for monitoring a voltage level at said input of said voltage regulator;

microprocessor connected to said means for monitoring and when said voltage level decreases below a first threshold, said microprocessor shuts down said electronic parking meter in an orderly manner.

2. A solar power system for an electronic parking meter according to claim 1, wherein when said electronic parking meter is shut down, said voltage regulator outputs a reset signal when said voltage level at said input of said voltage regulator exceeds a second threshold level, said reset signal being received by said microprocessor.

3. A solar power system for an electronic parking meter according to claim 1, wherein said means for monitoring is a resistor divider network, a juncture thereof being connected to said microprocessor.

4. A solar power system in an electronic parking meter comprising:

at least one solar cell array connected via a first diode to a power bus and for supplying power to said power bus;

at least one storage capacitor connected to said power bus via a current limiting diode for charging the capacitor and via a second diode for supply power to said power bus;

a voltage regulator having an input connected to said power bus and having a first output for providing a regulated supply voltage to said electronic parking meter and a second output for providing a reset signal to a microprocessor when the microprocessor is powered-down and when a voltage level at said input of said voltage regulator exceeds a second threshold;

means for monitoring said voltage level at said input of said voltage regulator and, when said microprocessor is in a standby mode or in an operational mode, providing a signal to said micrprocessor indicative of said voltage level decreasing below a first threshold, said microprocessor then being powered-down.

5. A solar power system for an electronic parking meter according to claim 4, wherein said means for monitoring is a resitor divider network, a juncture thereof being connected to said microprocessor.

6. A solar power system in an electronic parking meter comprising:

at least one solar cell array connected to an anode of a first diode;

at least one current regulating diode having its anode connected to a cathode of said first diode;

at least one storage capacitor connected between a cathode of said current regulating diode and ground;

at least one second diode having its anode connected to said storage capacitor and its cathode connected to an input of a voltage regulator, an output of said voltage regulator providing a supply voltage for said electronic parking meter, said input of said voltage regulator also connected to said cathode of said first diode;

means for monitoring a voltage level at said input of said voltage regulator;

microprocessor connected to said means for monitoring and when said voltage level decreases below a first threshold, said microprocessor shuts down said electronic parking meter in an orderly manner, and when said electronic parking meter is shut down, said voltage regulator outputs a reset signal when said voltage level at said input of said voltage regulator exceeds a second threshold level, said reset signal being received by said microprocessor, said means for monitoring being a resistor divider network, a juncture thereof being connected to said microprocessor.

* * * * *